UNITED STATES PATENT OFFICE 2,393,214

PROCESSING ACID SLUDGE

Ralph John Andrews, New Haven, Conn., assignor, by mesne assignments, to Wilson Carbon Company, Inc., New York, N. Y., a corporation of New York No Drawing. Application February 14, 1944, Serial No. 522,403

14 Claims. (Cl. 252—289)

The invention relates to a process for the treatment of sludge resulting from the acid refining of petroleum products. More particularly it pertains it pertains to a procedure for the conversion of an acid sludge into an active carbon, and includes correlated improvements and discoveries whereby a product of enhanced value may be obtained therefrom.

An acid sludge is obtained through the refining treatment of gasoline, lubricating oils, and other petroleum products with sulfuric acid, and this sludge contains a considerable amount of carbonaceous material admixed with sulfuric acid, sulfur compounds and water. Therefrom there may be obtained a tarry residue having a content of free acid, sulfur compounds and the like, and this residue is susceptible to carbonization.

It is an object of the invention to provide a process in accordance with which an acid sludge may be converted into an active carbon in hard granular form.

Another object of the invention is the provision of a mode of procedure whereby an active carbon, well adapted for the absorption and adsorption of gases, coloring matters, and the like, may be produced from an acid sludge.

A further object of the invention is to provide a process in accordance with which acid sludge may be converted into an active carbon readily, effectively, and economically.

Still another object of the invention is to provide a manner of treatment which results in the obtention of an active carbon from an acid sludge obtained in the refining of petroleum products with sulfuric acid.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention, an acid sludge may be converted into an active carbon by a procedure which comprises distilling such a sludge at a temperature from about 400° to about 750° F. whereby a black oily carbonaceous mass is obtained, then heating the carbonaceous mass so formed up to a temperature from about 1000° to about 1500° F. in an atmosphere of steam whereby said mass is carbonized, subsequently raising the temperature of the carbonized mass while under the influence of steam to the range from about 1600° to about 1800° F., and maintaining said temperature for a period of time which may be upwards to about 3 hours, and finally cooling the thus heated mass in an atmosphere of steam, desirably to a temperature which is less than 500° F.

The treatment of the acid sludge may be accomplished in a suitable apparatus, which may be a rotary kiln, a stationary kiln with internal rotating paddles, or in a multiple hearth furnace. The apparatus employed may be suitably heated with the sludge being desirably out of contact with air or combustion gases, and while being agitated. Such heating and agitation serves to remove the volatile portions, and the evolved gases may be exhausted to the air. Inasmuch as sulfur compounds, as sulfur dioxide, are contained therein in considerable quantities, it may be advantageous as well as necessary to extract such compounds for recovery, and, as in the case of sulfur dioxide, conversion either to sulfur trioxide or to sulfuric acid.

More particularly, the distillation of an acid sludge may be carried out at a temperature ranging from about 400° to about 750° F., preferably from about 500° to about 550° F. It has been found that such temperature should not exceed about 750° F. inasmuch as the subsequent treatment wherein active carbon is obtained is deleteriously effected when the distillation is carried out at a higher temperature.

The time of treatment may vary from about ½ to about 3 hours, depending largely on the type of apparatus utilized, and there is thus obtained a black oily carbonaceous mass containing from about 5 to about 55% of volatile hydrocarbons, and from about 3.5 to about 15% sulfur, as determined by the bomb washing method (ASTM).

The temperature at which the carbonaceous mass is produced has a pronounced effect on the subsequent procedure which results in an active carbon, and that procedure is also facilitated due to the porosity occasioned by the evolution of the various gases, and to the sulfur content. The carbonaceous mass so formed is then heated slowly until it is brought to a temperature from about 1000° to 1500° F., that is, a temperature relatively high and which avoids recoking into a large mass. This temperature preferably is about 1250° F. Such heating may be occasioned in a furnace, such as a multiple hearth furnace, wherein the mass is continuously stirred while being subjected to or in an atmosphere of steam.

The heating period may be upwards of about 3 hours, as from 1 to 3 hours, with the temperature being raised uniformly throughout. When the material is heated in the absence of steam, the product resulting does not activate advantageously. Therefore it is desirable that the furnace be supplied with low pressure superheated steam throughout the heating period. This may be from about 1 pound to about 5 pounds of steam per pound of the carbonaceous mass per hour. A carbonization of the mass is thereby effected; and the carbonized product resulting therefrom, which is already slightly active, may now be further activated by means of heat under the influence of steam.

Activation of the carbonized mass may be preceded by a comminution or grinding thereof to a desired size which is dependent upon the purpose for which the active carbon is to be utilized. Such comminution is not a prerequisite but is of material advantage.

Accordingly, if a granular activated carbon is sought, the carbonized mass may be comminuted to pass a 6 mesh Tyler screen, particle size 3.3 mm. and to remain on a 14 mesh screen with a particle size 1.17 mm. However, if a water treating carbon is desired, the comminution may then be such that the material will pass a 20 mesh screen with a particle size of 0.83 mm.

The carbonized mass, whether comminuted or not, may now be heated for a period from ½ hour to 1 hour, until it reaches a temperature from about 1600° F. to about 1800° F., preferably about 1680° F., and is maintained at that temperature for a period of time, according to the carbon type desired. Should a water treating carbon be produced, then the temperature would be maintained from about ½ hour to 2 hours, whereas if a gas absorption carbon is being produced, the period would be somewhat longer, e. g., upwards to about 3 hours. The desirable temperature maintenance period may be readily determined, inasmuch as too long a period either occasions loss of activity in the resulting carbon, or a limit of improvement in activity is reached.

The heating of the carbonized mass during this period is under the influence or in an atmosphere of steam, and the mass is suitably stirred or agitated, as by rabbling. The steam required may vary from 1 to 5 pounds per pound of carbonized material per hour, and it is preferably supplied at a pressure below 5 pounds per square inch gauge. Additionally, it is desirable that steam be superheated. Following this heating or activating treatment, the carbon mass may be cooled in an atmosphere of saturated, or of ordinary steam until the temperature is less than 500° F.

An active carbon produced in the manner hereinbefore described is well adapted for the removal of taste and odor from drinking water; for the decolorization of sugar, oils and pharmaceuticals; and especially when in granular form for the absorption and adsorption of gaseous bodies.

As an illustrative embodiment of the manner in which the invention may be practiced, the following description is presented:

An acid sludge which may contain about 12.95% of sulfur, as determined by the aforesaid method, may be heated slowly until a relatively solid black oily carbonaceous mass results at a temperature of about 700° F. During the heating period the sludge may be continuously stirred so that the heating may be uniform and gaseous products removed. This solid mass, which is oily, is quite porous and may have a volatiles content of about 47.6%, sulfur about 3.44%, and an ash of about 0.24%. The mass may be broken into small lumps and heated for a period of about 3.5 hours in a suitable furnace at a temperature from about 1200 to 1250° F. Steam at about 2 pounds pressure and at a temperature of about 800° F. may be conducted through the mass during the period of heating at a rate of about 2 pounds of steam per pound of the carbonaceous mass per hour.

At the end of this heating period the mass is carbonized; is hard; and relatively low in volatile matter containing about 12.9%. The carbonized mass may then be comminuted by grinding so that it will pass a 20 mesh Tyler screen thus having a particle size of 0.83 mm.

Subsequently the carbonized and comminuted mass is raised to a temperature of about 1680° F. and heated thereat for about 1 hour, with superheated steam at a temperature of about 800° F., being supplied at a pressure of about 2 pounds. The rate of steam flow is about 2 pounds per pound of carbonized material per hour. At the end of one hour the active carbon is removed from the furnace and cooled out of contact with the air, as in an atmosphere of steam. It is then ground in a pebble mill until 99% passes through a 325 mesh Tyler screen which has a mesh size of 0.044 mm.

Upon test in accordance with the American Water Works Association standard the phenol value was determined to be 14.7. It may be added that in order to obtain a relatively large quantity of active carbon from an acid sludge it is advisable to distill or initially heat it out of contact with air or with combustion gases. This may be accomplished by introducing acid sludge on to a slowly moving endless conveyor which passes through a substantially air tight heating chamber, which may be brick lined and so constructed as to conduct the gaseous substances away as they are formed and evolved. As above indicated, these gaseous bodies, which include sulfur dioxide and hydrocarbon vapors, may be exhausted to the air, or, and advantageously so, they may be conducted into suitable apparatus for recovery or conversion. The conveyor may consist of overlapping steel plates supported on an endless chain which passes over suitable pulleys outside the chamber.

Heating of the conveyor may be effected by burners suitably located below the heating chamber, and more particularly under that portion of the conveyor which is within the chamber. A layer of carbonaceous material is formed on the surface of the conveyor and may be removed, outside of the heating chamber, by a suitable means, as a scraper or scrapers.

Heating of the sludge may also be carried out in a muffle type of furnace having a steel or cast iron hearth which is heated underneath. The acid sludge may be flowed over the hearth and rabbled or stirred by rotating arms until a relatively dry carbonaceous mass is produced. This mass can then be removed from the furnace in a suitable manner. During such heating, the temperature may be from 400 to 750° F., and, as above mentioned, should not be higher.

An active carbon produced in accordance with the foregoing procedure is adapted for use in manners like unto that for other activated carbons. Thus it may be employed for purifying gases like carbon dioxide through selective retention of impurities when the absorbed gas is removed from the carbon; for the absorption of gases and vapors of hydrocarbons, as the saturated hydrocarbons of the methane series which are present in natural gases; for the absorption of casing-head gas; for the absorption of unsaturated and other gases, as those present in petroleum refining operations, particularly in pressure stills; and for the absorption of toxic gases such as are found in various industrial operations and in warfare.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the conversion of an acid sludge resulting from treatment of a petroleum distillate with sulphuric acid into an active carbon, which comprises distilling the acid sludge in substantial absence of air at a temperature from about 400° to about 750° F., whereby a black oily carbonaceous mass is obtained, then heating such carbonaceous mass up to a temperature from about 1000° to about 1500° F. in an atmosphere of steam whereby said mass is carbonized, and subsequently raising the temperature of the carbonized mass while under the influence of steam to about 1600° to about 1800° F. and maintaining said temperature for a period of time sufficient to effect activation of said carbonized mass.

2. A process for the conversion of an acid sludge resulting from treatment of a petroleum distillate with sulphuric acid into an active carbon, which comprises distilling the acid sludge at a temperature from about 500° to about 550° F. for a period from about ½ to about 3 hours, whereby a black oily carbonaceous mass is obtained, then heating such carbonaceous mass up to a temperature from about 1000° to about 1500° F. in an atmosphere of steam whereby said mass is carbonized, and subsequently raising the temperature of the carbonized mass while under the influence of steam to about 1600° to about 1800° F. and maintaining said temperature for a period of time, sufficient to effect activation of said carbonized mass.

3. A process for the conversion of an acid sludge resulting from treatment of a petroleum distillate with sulphuric acid into an active carbon, which comprises distilling the acid sludge in substantial absence of air at a temperature from about 500° to about 550° F. for a period from about ½ to about 3 hours, whereby a black oily carbonaceous mass is obtained, then heating such carbonaceous mass up to a temperature from about 1000° to about 1500° F. in an atmosphere of steam whereby said mass is carbonized, and subsequently raising the temperature of the carbonized mass while under the influence of steam to about 1600° to about 1800° F. and maintaining said temperature for a period of time sufficient to effect activation of said carbonized mass.

4. A process for the conversion of an acid sludge resulting from treatment of a petroleum distillate with sulphuric acid into an active carbon which comprises, distilling the acid sludge at a temperature from about 400° to about 750° F., whereby a black oily carbonaceous mass is obtained, then heating such carbonaceous mass up to a temperature from about 1000° to about 1500° F. in an atmosphere of steam whereby said mass is carbonized, and subsequently raising the temperature of the carbonized mass while under the influence of steam to about 1600° to about 1800° F. and maintaining said temperature for a period of time sufficient to effect activation of said carbonized mass.

5. A process for the conversion of an acid sludge resulting from treatment of a petroleum distillate with sulphuric acid into an active carbon, which comprises distilling the acid sludge at a temperature from about 400° to about 750° F., whereby a black oily carbonaceous mass is obtained, then heating such carbonaceous mass up to a temperature from about 1000° to about 1500° F. for a period from about 1 to about 3 hours in an atmosphere of steam whereby said mass is carbonized, and subsequently raising the temperature of the carbonized mass while under the influence of steam to about 1600° to about 1800° F. and maintaining said temperature for a period of time, sufficient to effect activation of said carbonized mass.

6. A process for the conversion of an acid sludge resulting from treatment of a petroleum distillate with sulphuric acid into an active carbon, which comprises distilling the acid sludge at a temperature from about 400° to about 750° F., whereby a black oily carbonaceous mass is obtained, then heating such carbonaceous mass slowly and uniformly up to a temperature from about 1000° to about 1500° F. in an atmosphere of steam with agitation, whereby said mass is carbonized, and subsequently raising the temperature of the carbonized mass while under the influence of steam to about 1600° to about 1800° F. and maintaining said temperature for a period of time sufficient to effect activation of said carbonized mass.

7. A process for the conversion of an acid sludge resulting from treatment of a petroleum distillate with sulphuric acid into an active carbon, which comprises distilling the acid sludge in substantial absence of air at a temperature from about 500° to about 550° F. whereby a black oily carbonaceous mass is obtained, then heating such carbonaceous mass slowly and uniformly to a temperature of about 1200° F. in an atmosphere of steam with continuous stirring whereby said mass is carbonized, and subsequently raising the temperature of the carbonized mass while under the influence of steam to about 1600° to about 1800° F. and maintaining said temperature for a period of time, sufficient to effect activation of said carbonized mass.

8. A process for the conversion of an acid sludge resulting from treatment of a petroleum distillate with sulphuric acid into an active carbon which comprises, distilling the acid sludge at a temperature from about 400° to about 750° F., whereby a black oily carbonaceous mass is obtained, then heating such carbonaceous mass up to a temperature from about 1000° to about 1500° F. in an atmosphere of steam whereby said mass is carbonized, subsequently raising the temperature of the carbonized mass while under the influence of steam to about 1600° to about 1800° F., and maintaining said temperature for a period of time, sufficient to effect activation of said carbonized mass and finally cooling in an atmosphere of steam until below about 750° F.

9. A process for the conversion of an acid sludge resulting from treatment of a petroleum distillate with sulphuric acid into an active carbon, which comprises distilling the acid sludge at a temperature from about 400° to about 750° F., whereby a black oily carbonaceous mass is obtained, then heating such carbonaceous mass up to a temperature from about 1000° to about 1500° F. in an atmosphere of steam whereby said mass is carbonized, subsequently raising the temperature of the carbonized mass while under the influence of steam to about 1600° to about 1800° F. and maintaining said temperature for a period of time, sufficient to effect activation of said carbonized mass and finally cooling to a temperature lower than 500° F. in an atmosphere of steam.

10. A process for the conversion of an acid sludge resulting from treatment of a petroleum distillate with sulphuric acid into an active carbon, which comprises distilling the acid sludge at a temperature from about 400° to about 750° F., whereby a black oily carbonaceous mass is obtained, then heating such carbonaceous mass up to a temperature from about 1000° to about 1500° F. in an atmosphere of steam whereby said mass is carbonized, and subsequently raising the temperature while under the influence of steam through a period from about ½ to about one hour to a temperature from about 1600° to about 1800° F. and maintaining said temperature for a period upwards to about 3 hours.

11. A process for the conversion of an acid sludge resulting from treatment of a petroleum distillate with sulphuric acid into an active carbon, which comprises distilling the acid sludge at a temperature from about 400° to about 750° F., whereby a black oily carbonaceous mass is obtained, then heating such carbonaceous mass up to a temperature from about 1000° to about 1500° F. in an atmosphere of steam whereby said mass is carbonized, and subsequently raising the temperature while under the influence of superheated steam to about 1680° F. and maintaining said temperature for a period upwards to about 3 hours with stirring.

12. A process for the conversion of an acid sludge resulting from treatment of a petroleum distillate with sulphuric acid into an active carbon, which comprises distilling the acid sludge at a temperature from about 400° to about 750° F., in substantial absence of air whereby a black oily carbonaceous mass is obtained, then heating such carbonaceous mass up to a temperature from about 1000° to about 1500° F. in an atmosphere of steam whereby said mass is carbonized, comminuting the carbonized mass, and subsequently raising the temperature thereof while under the influence of steam from about 1600° to about 1800° F. and maintaining said temperature for a period upwards to about 3 hours and cooling in an atmosphere of steam until below about 750° F.

13. A process for the conversion of an acid sludge resulting from treatment of a petroleum distillate with sulphuric acid into an active carbon, which comprises distilling the acid sludge at a temperature from about 400° to about 750° F., whereby a black oily carbonaceous mass is obtained, then heating such carbonaceous mass up to a temperature from about 1000° to about 1500° F., in an atmosphere of steam whereby said mass is carbonized, comminuting the carbonized mass to a size ranging from about 0.83 to about 3.3 mm., and subsequently raising the temperature of the comminuted mass while under the influence of steam from about 1600° to about 1800° F. and maintaining said temperature for a period upwards to about 3 hours with stirring.

14. In a process for the conversion of an acid sludge resulting from treatment of a petroleum distillate with sulphuric acid into an active carbon, the improvement which comprises the step of distilling the acid sludge at a temperature below about 750° F., in combination with the step of using an atmosphere of steam while thereafter heating the resulting material above 750° F. for further carbonization and activation.

RALPH JOHN ANDREWS.